United States Patent
Franklin et al.

(10) Patent No.: US 8,132,978 B2
(45) Date of Patent: Mar. 13, 2012

(54) TOOL POSITIONING SYSTEM

(75) Inventors: Ronald D. Franklin, Sacramento, CA (US); Michael D. McCollum, Sacramento, CA (US); Lucas R. Franklin, Lakewood, OH (US)

(73) Assignee: Franklin Tool Systems, Inc, Sacramento, CA (US)

( * ) Notice: Subject to any disclaimer, the term of this patent is extended or adjusted under 35 U.S.C. 154(b) by 313 days.

(21) Appl. No.: 12/376,571

(22) PCT Filed: Apr. 15, 2008

(86) PCT No.: PCT/US2008/060312
§ 371 (c)(1),
(2), (4) Date: Feb. 6, 2009

(87) PCT Pub. No.: WO2008/130908
PCT Pub. Date: Oct. 30, 2008

(65) Prior Publication Data
US 2010/0183362 A1     Jul. 22, 2010

Related U.S. Application Data

(60) Provisional application No. 60/923,581, filed on Apr. 16, 2007.

(51) Int. Cl.
*F16C 11/00*      (2006.01)
(52) U.S. Cl. ................. 403/96; 403/84; 16/324
(58) Field of Classification Search ............ 403/72, 403/73, 91, 92, 96, 97, 103; 16/319, 321, 16/322, 324, 348, 349, 429; 15/230.11; 74/530
See application file for complete search history.

(56) References Cited

U.S. PATENT DOCUMENTS

| | | | |
|---|---|---|---|
| 3,205,522 A * | 9/1965 | Then | 15/146 |
| 4,186,905 A * | 2/1980 | Brudy | 248/478 |
| 4,614,452 A * | 9/1986 | Wang | 403/27 |
| 5,123,768 A * | 6/1992 | Franklin | 403/96 |
| 5,207,755 A * | 5/1993 | Ampian | 15/230.11 |
| 5,520,474 A * | 5/1996 | Liu | 403/97 |
| 5,547,305 A * | 8/1996 | Treche | 403/97 |
| 5,715,562 A * | 2/1998 | Lowrey et al. | 15/230.11 |
| 5,765,958 A * | 6/1998 | Lan | 403/97 |
| 5,867,911 A * | 2/1999 | Yates et al. | 30/276 |
| 6,086,284 A * | 7/2000 | Callahan | 403/93 |
| 6,128,800 A * | 10/2000 | Vosbikian | 15/172 |
| 6,629,801 B2 * | 10/2003 | Cheng | 403/101 |
| 6,692,178 B2 * | 2/2004 | Yu | 403/85 |
| 6,805,513 B2 * | 10/2004 | Marquina | 403/107 |
| 7,617,569 B2 * | 11/2009 | Liao | 16/334 |
| 7,631,575 B2 * | 12/2009 | Gard et al. | 74/530 |
| 7,761,951 B1 * | 7/2010 | O'Neal, Jr. | 15/230.11 |
| 2002/0131814 A1 * | 9/2002 | Hou et al. | 403/97 |
| 2002/0159824 A1 * | 10/2002 | Marquina | 403/97 |
| 2003/0202840 A1 * | 10/2003 | Watkins | 403/97 |
| 2004/0179891 A1 * | 9/2004 | Watkins et al. | 403/96 |
| 2008/0109994 A1 * | 5/2008 | Liao | 16/319 |

* cited by examiner

*Primary Examiner* — Joshua Kennedy
(74) *Attorney, Agent, or Firm* — Law Offices of David M. Lang; David M. Lang, Esq.

(57) ABSTRACT

A tool positioning apparatus permitting tool adjustment in two planes, the apparatus generally including an articulating joint apparatus and a resistance thread mechanism for rotatably positioning a tool about a central axis. In one embodiment the joint includes two halves rotatable about a central axis. The two halves are positionable through use of a push-button release that disengages a gear member and permits movement of the two halves relative to each other. In one embodiment, a gear has teeth disposed on one surface, two opposing substantially straight sides, and two opposing substantially curved sides, with a triangular protrusion mounted on each of the gear's two straight portions. The thread resistance mechanism utilizes an elastomeric threading in a narrowing taper.

19 Claims, 6 Drawing Sheets

TOOL POSITIONING SYSTEM

CROSS-REFERENCE TO RELATED APPLICATIONS

This application claims the benefit of priority under 35 U.S.C. §119(e), of U.S. Provisional Application 60/923,581, filed on Apr. 16, 2007, entitled "TOOL POSITIONING SYSTEM," and PCT/US08/60312, filed on Apr. 15, 2008, entitled "TOOL POSITIONING SYSTEM" the entirety of both above applications expressly incorporated herein by reference.

BACKGROUND

The present invention relates to a tool positioning system that generally includes an articulating joint apparatus and a resistance thread mechanism for rotatably positioning a tool about a central axis. Specifically, the positioning system may be adapted for use with paint rollers, paint spray shields, paint brush holders, window cleaning equipment, concrete tools, brooms, and the like, as well as other devices which may be attached to a handle. Articulating joints known in the prior art permit a reversibly lockable positioning and repositioning within a useful range of operation. Articulating joints may be rapidly repositionable and further include a method of maintaining the integrity of the joint's locked status when the joint is stressed.

Hand tools such as paint rollers are often affixed to handles or pole-type extensions, which rigidly attach to the tool head and extend the useful reach of the tool. While a handle or pole increases tool reach, the use of such an extension pole essentially limits the user to a substantially vertical use. Not infrequently, it is desirable to use a tool mounted on an extension pole in a position other than vertical; however, tool movement is awkward at best and renders application of the proper amount of force to the tool at the tool's contact surface difficult if not impossible. Therefore, horizontal or angular use is often difficult, awkward, and may be hazardous. In an effort to complete an unwieldy task, a user may adopt an unnatural body posture. The user may use improper body mechanics to complete the task, which may result in occupational injury as well as inadequate task performance. The user additionally risks falling when working from heights.

Further, it is often desirable to rotatably position and reposition a tool. For example, when painting with a paint roller mounted on an extension pole, the roller is typically horizontal to the ground. It is often advantageous to change the position of the roller to permit painting in different directions, for example, by orienting the paint roller perpendicular to the ground.

Therefore, a need exists for an improved device which can permit an otherwise rigid tool to be pivotably movable, reversibly lockable in several positions, and capable of keeping the joint fixed in position under the stress of tool use. A need also exists for a device which permits rotatable positioning and repositioning of a tool.

Examples of moveable joints for connecting components can be found in U.S. Pat. No. 5,123,768, to Franklin on Jun. 23, 1992, which discloses, in part, a push-button adjustable jointed coupling for attaching paint rollers and the like. The drawback of U.S. Pat. No. 5,123,768 is that the apparatus utilizes a number of working metal parts, including a locking collar, set screw, cover plate, and two set screws on the cover plate; these components make the apparatus heavy and difficult to manufacture. U.S. Pat. No. 5,867,911 to Yates et al., discloses, in part, a two member apparatus with axially spaced teeth upon a first and second axially spaced button. U.S. Pat. No. 6,086,284 to Callahan discloses, in part, a lockable hub device having a base that accommodates a ganged pair of lockable attachment rings. U.S. Pat. No. 6,692,178, to Hsiu-E Yu, discloses, in part, a pivotable tool having a pair of interconnected arms disposed in a crossing relationship and having a manually releasable releasing device which locks the arms in a perpendicular open position for use as a wrench. U.S. Pat. No. 5,547,305 to Treche discloses, in part, a fastening subassembly for securing a hotstick component to another component or hotstick. U.S. Pat. No. 5,207,755 to Ampian, discloses, in part, a universally adjustable paint roller where the roller may be adjusted about three orthogonally disposed axes having a rotating mechanism coupled to an L-shaped member. U.S. Pat. No. 5,715,562 to Lowrey, et al. discloses, in part, a painting device with a pivotal adjustment frictionally held in place; the friction may be overcome by manual pressure to readjust joint position.

None of the foregoing devices, however, provide an adequate repositionable articulating joint offering attachment to a variety of tools, tool handles, and tool handle extensions, which is easy to manufacture, lightweight, can be easily adjusted with one hand, which resist interference with their operation from paint, concrete, mud and other contaminants, and which will not break or separate under relatively high-force or high-torque applications.

SUMMARY

The present invention relates to a tool positioning system that generally includes an articulating joint apparatus and a resistance thread mechanism for rotatably positioning a tool about a central axis. In one embodiment, the invention offers, in part, a rapidly repositionable joint that is lightweight, and may be substantially produced by injection molding, and therefore relatively easy and cost effective to manufacture. The joint includes two halves rotatable about a central axis. The two halves are positionable through use of a push-button release that disengages a gear member and permits movement of the two halves relative to each other. The example embodiment gear, used within said joint, has teeth disposed on one surface and substantially curvilinear and substantially rectilinear portions with a triangular protrusion mounted on each of the two rectilinear portions. The triangular protrusion distributes force to prevent movement of the joint when the joint is under force. Pressing a push button releases the gear and permits adjustment. Releasing the button engages the gear and locks the joint into place. The gear and lock mechanism is constructed such that the button can be depressed and the coupling adjusted to a new position with the use of only one hand.

The present invention further offers an improved apparatus for frictionally securing a threaded engagement utilizing an elastomeric internal tapering thread mounted within a female housing and affixed to a tool handle. The tapering fosters enhanced frictional engagement with the distal most aspect of a male threaded element. Once the internal taper is sufficiently engaged by the male threaded element, sufficient frictional force exists to inhibit tool movement between the threaded elements attributable to relatively modest torque and vibratory forces. When a relatively strong torque is applied to the tool end when rotationally repositioning the tool, the resistance provided by the elastomeric internal tapered thread is overcome, threaded elements may be further tightened.

In the present field of use, the apparatus may be used to frictionally secure a paint roller or similar tool in a position (e.g. horizontal relative to the ground) once the taper is reached. When a new position is desired (e.g. vertical relative to the ground) the tool is further tighteningly rotated to the desired position, whereby the male element advances further into the elastomeric taper and frictionally maintains the tool in position.

Further, the present invention, in part, offers a novel dual-positioning, tool utilization and painting system where through use of an extension pole, a tool may be firstly positioned through an articulating joint relative to the extension pole, and secondly positioned through a frictionally secured rotating positioning system. One specific embodiment of the tool positioning system is designed to be used with paint rollers, wipers, cleaners, and the like.

As an example, a painter utilizing a paint roller mounted on an extension pole can adjust the roller to a variety of angles, often with one hand, thereby permitting the painter to paint around moldings, under roof eaves, and other hard-to-roll surfaces conveniently and quickly. Other tools can be conveniently adjusted in similar fashion. This advantage of tool positioning, multiple positioning, and repositioning increases the usability of tools in locations beyond the user's normal reach and permit tools to be positioned, moved and maneuverable in varied directions. The positioning aspect of the invention minimizes the need for constant movement of ladders or other platforms (which may be unstable) to reach awkward overhead positions with a tool. The availability of tool positioning and repositioning may assist in preventing occupational injury from falls, substandard body mechanics, and other injuries attributable to using a tool mounted on a lengthy extension pole. It is anticipated that the described invention will offer users, in part, a durable, long lasting joint, which can withstand daily, rugged use in the construction industry. It is further anticipated that aspects of the invention will result in a flexible jointed tool system that is easy to manufacture, cost efficient to field and deploy, and lightweight making it easy and safe to use.

DETAILED DESCRIPTION OF CERTAIN PREFERRED AND ALTERNATIVE EMBODIMENTS

Figure 1:
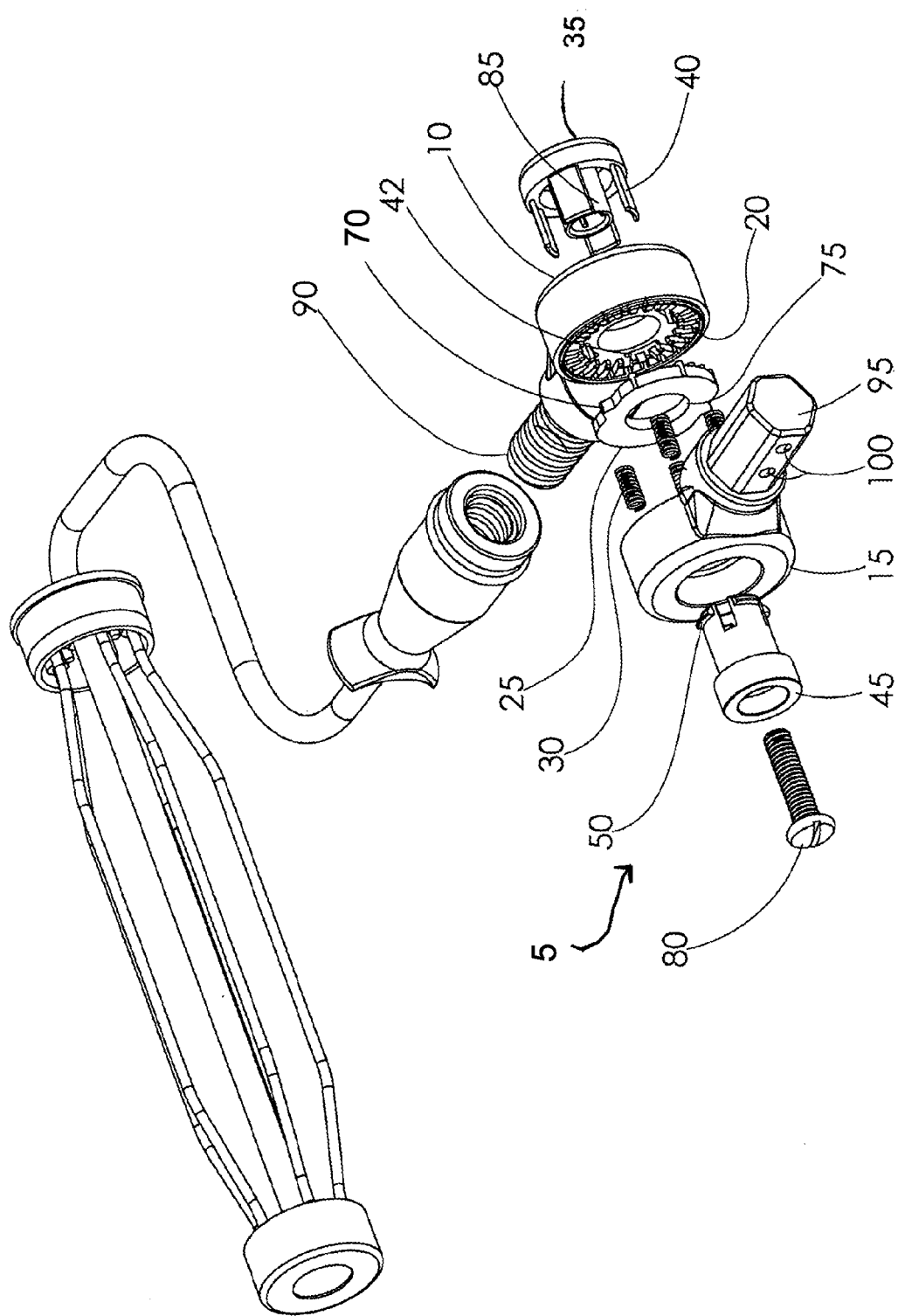
FIG. 1 is a perspective exploded view of the present invention.
Figure 2:
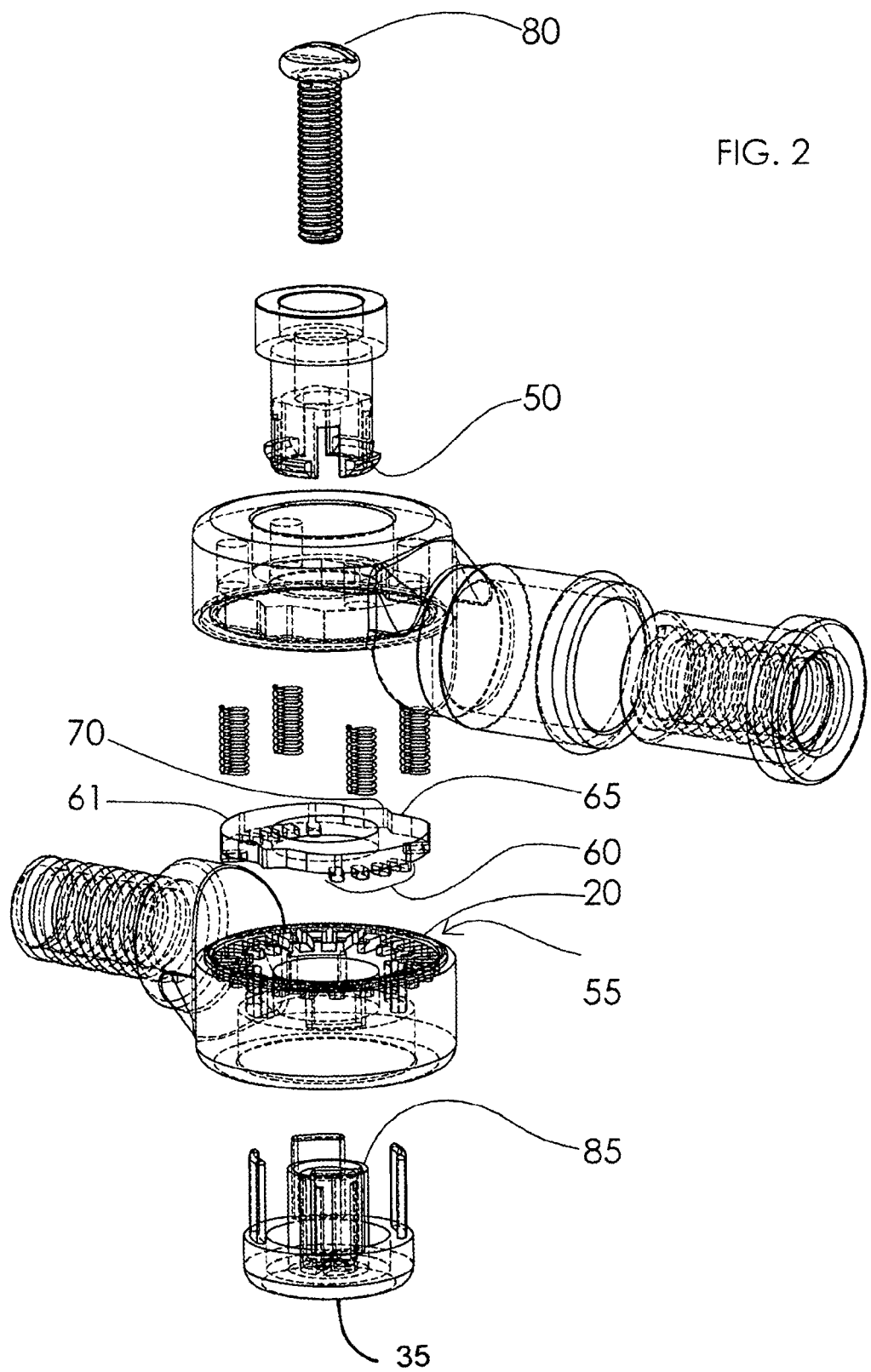
FIG. 2 is an exploded perspective view of the articulating joint.

Referring now descriptively to the drawings, FIG. 1, illustrates an exploded view of an exemplar embodiment of the present invention. The apparatus generally 5, is comprised of a first housing member 10 having an internal surface and external surface, and a second housing member 15. The internal surface of first housing member 10 is comprised of plurality of housing teeth 20 capable of mating with and reversibly engaging gear 25. Gear 25 is urged into position against first housing member 10 through a biasing means, such as a plurality of springs 30 which bias the outwardly facing surface of gear 25 into contact with the plurality of housing teeth 20 on the innermost aspect of housing member 10. The opposite ends of springs 30 are recessed each within a cylindrical housing mounted on the innermost aspect of second housing member 15. A push button 35 having at least one projection, and in a preferred embodiment a plurality of projections 40 inserting through suitably sized aperture 42 in first housing member 10. A snap axle 45 rests within a central aperture of second housing member 15 where snap axle 45 locks into place through a plurality of resilient inwardly deformable legs 50, each bearing an external ridge. When snap axle 45 is pushed through the central aperture of second housing member 15, legs 50 are inwardly deformed, and when the ridged ends emerge from the inwardly facing side of second housing member 15 and legs 50 move outwardly and resume their natural position whereby the terminal ridged ends lock snap axle 45 firmly into place. A circumferential rim 55 on first housing member 10 engages a circumferential recess on second housing member 15, permitting the first housing member 10 and second housing member 15 to engage along the perimeter of each and be rotatable relative to each other.

Figure 4:
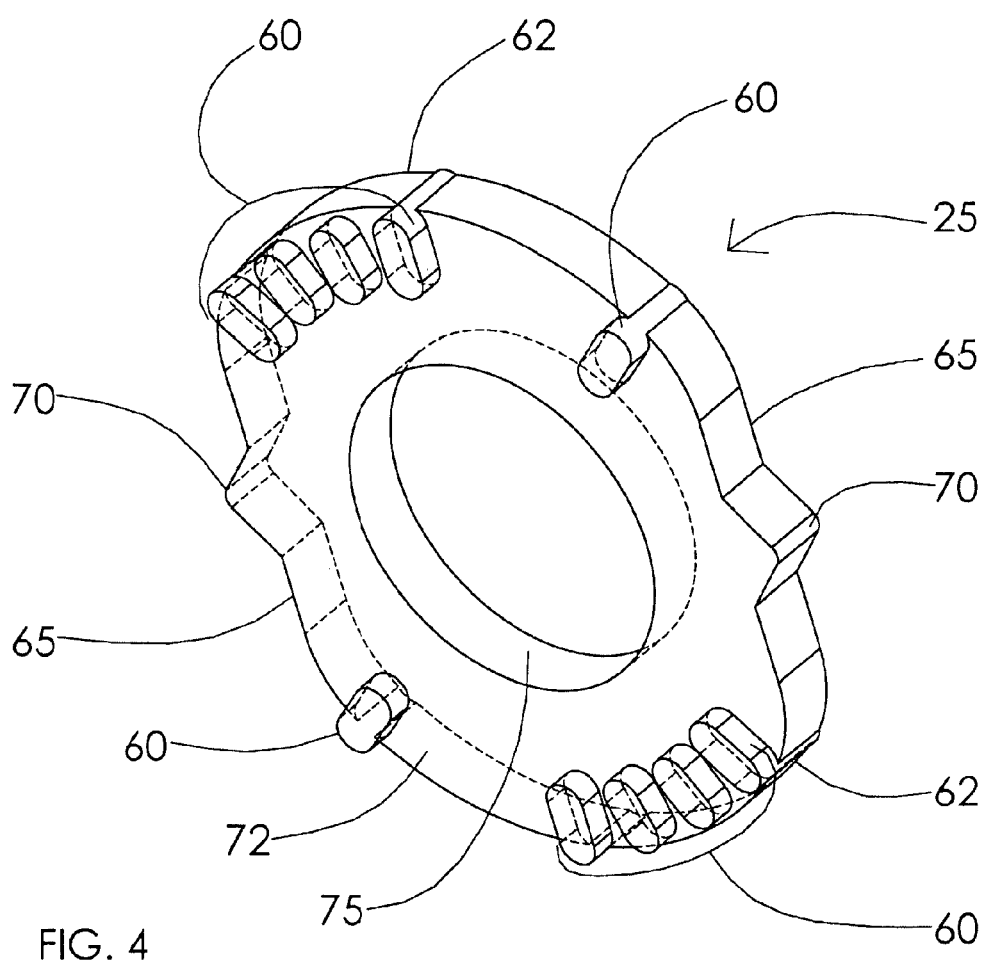
FIG. 4 is a perspective view of the gear depicting the surface bearing teeth.
Figure 5:
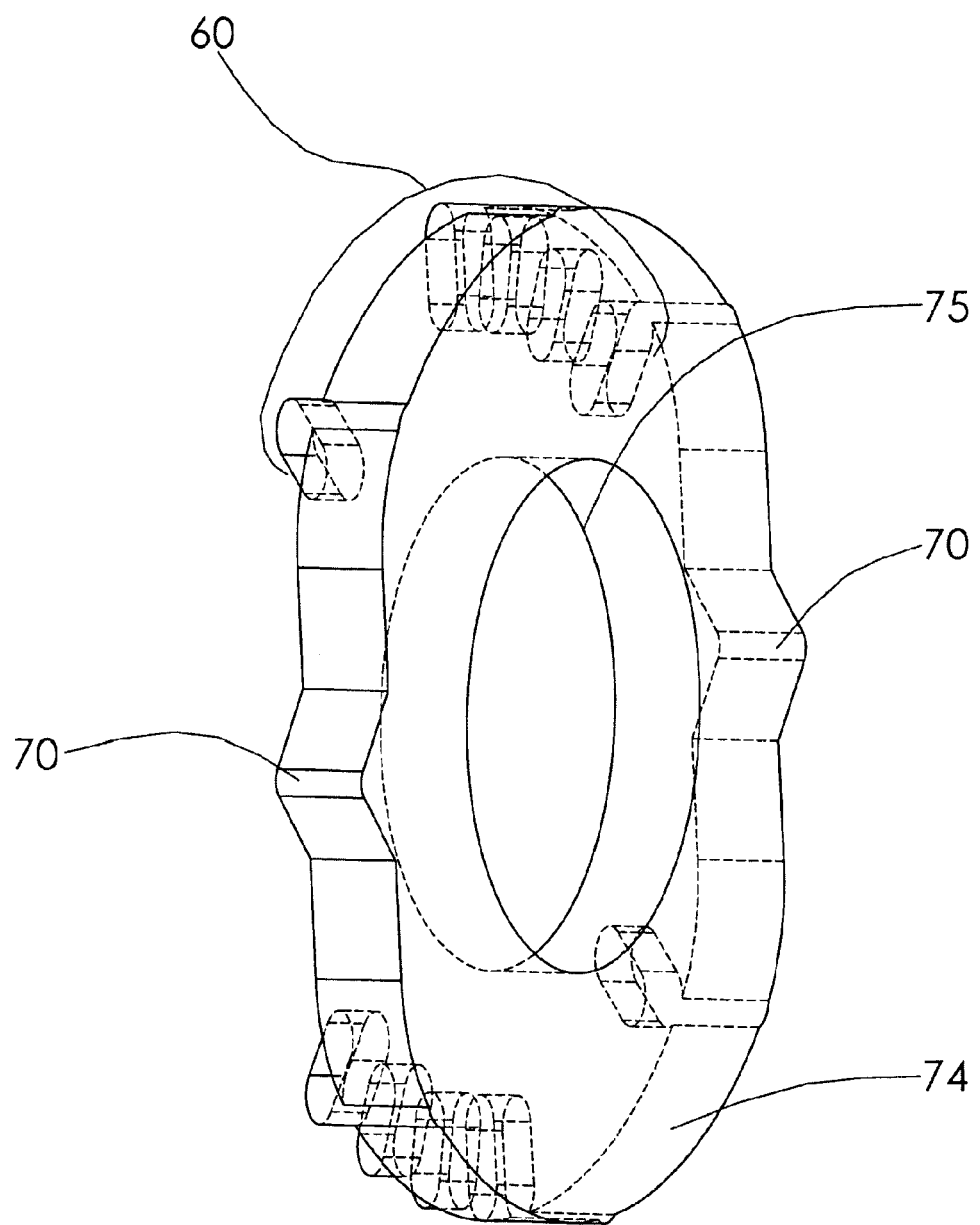
FIG. 5 is a perspective view of the gear.
Figure 6:
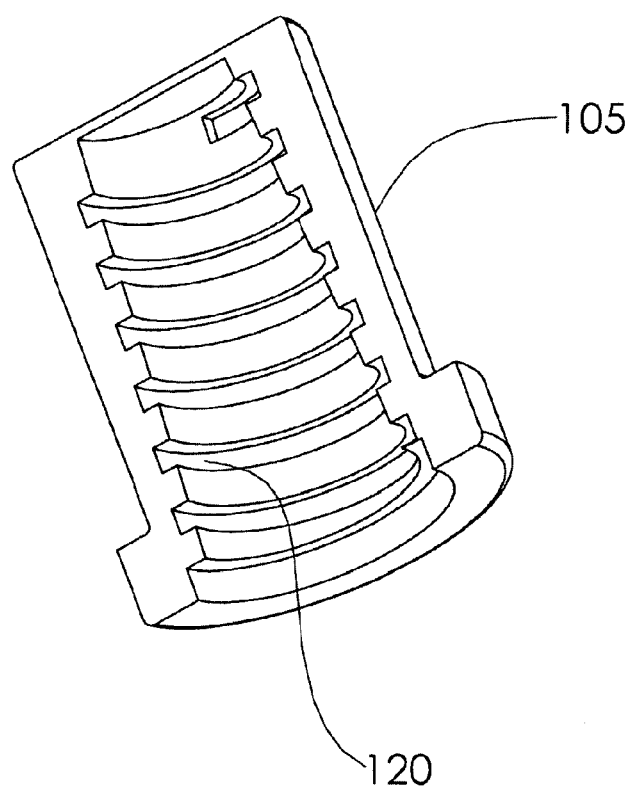
FIG. 6 is a cross-sectional perspective view of female housing illustrating the internal taper.

Referring now to FIG. 4, gear 25 includes a plurality of teeth 60, and in a preferred embodiment there are ten teeth. Gear 25 has two opposing substantially straight sides 65, and two opposing substantially curved sides 62. On the center of each opposing substantially straight side 65, an outwardly oriented triangular protrusion 70 exists, such that the apex of said triangle is at the center of said straight portion. The teeth 60 of gear 25 are disposed on the inwardly facing gear surface 72 such that they are oriented toward the plurality of housing teeth 20 located on first housing member 10. The opposite face, the outwardly facing gear surface 74, of gear 25 is substantially smooth. The teeth of gear 25 extend radially outward with regard to the center most aspect of the centrally disposed aperture 75 of gear 25 and the long axis of each component tooth. In a one preferred embodiment, a pan head screw 80 is inserted through the center aperture of snap axle 45. The terminal end of screw 80 inserts into hollow cylinder 85 disposed within pushbutton 35. Hollow cylinder 85 has a plurality of ribs, oriented lengthwise along said cylinder, which permit the terminal end of screw 80 to self-tap the ribs of said cylinder and screwably fasten snap axle 45 and pushbutton 35, with first housing member 10 and second housing members 15 and springs 30 and gear 25 being fastened therebetween. Alternatively, any variety of alternative securing mechanisms may be used to maintain the components together.

Referring again to FIG. 1, the first housing member 10 has a male threaded projection 90 on the external surface, which may be screwably coupled to a variety of tools designed for use on an extension pole. The second housing member 15 has a coupling means for attaching to a pole, such as hexagonally shaped projection 95, which can be insertably disposed within and coupled to an extension pole. Two sets of elliptical holes 100 are capable of receiving screws or other fasteners to fasten the hexagonally shaped projection 95 of second housing member 15 to an extension pole. Each side of the hexagonally shaped projection 95 has a series of progressive rib protrusions that serve to create a snug fit where the hexagonal projection 95 is inserted into an extension pole. In an alternative embodiment, any alternative method of coupling the joint to the tool and pole may be utilized, including for example as non-limiting examples threaded or push-fit coupling or other suitable coupling schemes.

Regarding the function of the present invention, in the assembled resting state, springs 30 exert bias against gear 25 urging the gear teeth 60 into a mating engagement with housing teeth 20, whereby the first housing member 10 and second housing member 15 are fixed in position relative to each other. To change the position, pushbutton 35 is depressed causing projections 40 to contact gear 25 on inwardly facing surface 72 and overcome bias produced by springs 30 and thereby disengage gear's teeth 60 from housing teeth 20 rendering first housing member 10 and second housing member 15 rotatable about a central axis relative to each other through an example range of approximately 200 degrees. This range may vary depending on the circumstances and the anticipated varied needs of the user. When manual pressure on pushbutton 35 is released, spring bias again urges gear 25 toward the innermost aspect of first housing member 10 resulting in a meshing engagement between housing teeth 20 and gear teeth 60, whereupon the position of first housing member 10 and second housing member 15 become locked relative to each other. Triangular protrusion 70, disposed on the substantially straight portion 65 of gear 25 distributes force when the joint is stressed.

Figure 3:
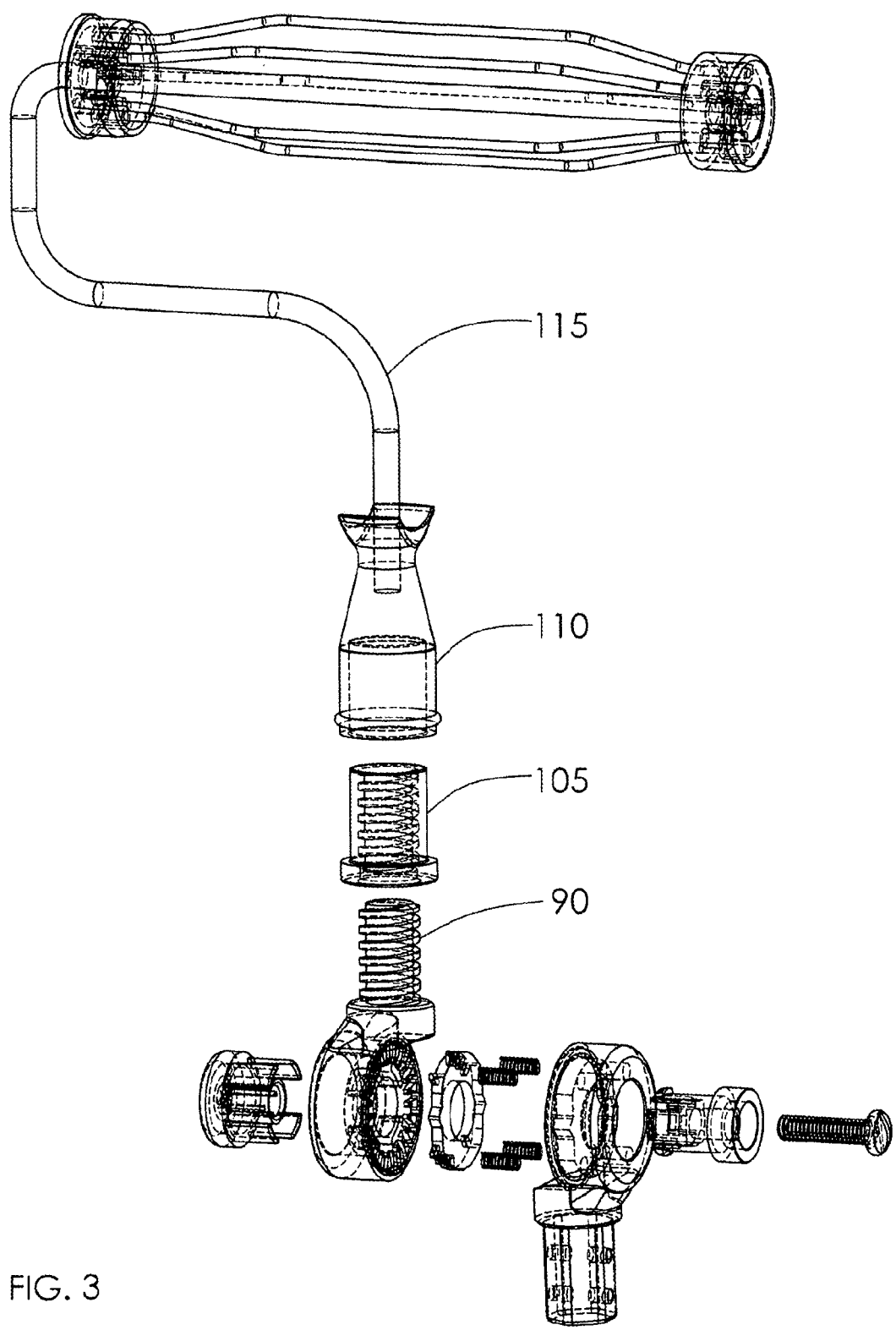
FIG. 3 is an exploded perspective view of the articulating joint and an example female coupling containing the resistance thread with an exemplar roller handle.

One aspect of the present invention is a resistance thread mechanism for securing a tool in a relatively fixed position. The tool is rotatable about a central axis and positionable in a 360-degree range of operation. FIG. 3 illustrates an example embodiment where male threaded projection 90 is threadably inserted into an internal threading 120 contained within female housing 105. Female housing 105 is disposed within tool handle housing 110 which, in the example embodiment, is coupled to tool 115, exemplified as a paint roller.

The outer aspect of female housing 105 is comprised of a cylindrically shaped plastic housing with a proximal end and distal end. The innermost aspect of female housing 105 has an internal threading 120 with a proximal end and distal end. In a preferred embodiment, internal threading 120 is comprised of an elastomeric material, preferably rubber, which in a preferred embodiment, is tapered from wide to narrow with the narrowest portion being the thread end closest to tool 115. Importantly, the degree of taper and composition of internal threading may vary and will depend upon the type of tool used, substance applied, job-specific forces applied to various tools, individual use characteristics, and the anticipated varied needs of the end user. In an alternative embodiment, internal threading 120 is comprised of a standard threading in lieu of tapered threading. Furthermore, in an alternative embodiment, male projection and female housing can be reversed, such that female housing 105 containing internal threading 120 is mounted on first housing member 10.

Referring now to FIG. 3, female housing 105 is disposed within and affixed to tool handle housing 110 which is coupled to a tool 115. In an alternative embodiment, female housing 105 could be omitted and tool handle housing 110 could be formed to permit internal threading 120, either tapered or non-tapered, to be disposed directly within tool handle housing 110. Male threaded portion 90 screwably engages internal threading 120 within female housing 105. As the distal most aspect of male threaded portion 90 reaches the progressive taper of threading 120, the fit becomes progressively snug. When tool 115 has engaged tapered internal threading 120 sufficiently to prevent tool movement during use typical for the specific tool, it may be operated in that position.

For example, when tool 115 is comprised of a standard paint roller used to apply paint, primer, or the like, when mounted from an extension pole, said tool will be screwably coupled to male threaded portion 90 and maintained in frictional engagement with internal threading 120 with approximately 70% of said threaded male disposed within female housing 105. When a different operating position is required (e.g. vertical tool disposition) tool 115 is further tighteningly rotated (e.g. 90 degrees) to a new operating position. Tool 115 is maintained in snug position by frictional contact with elastomeric material comprising internal threading 120. Frictional contact provided by internal threading 120 prevents unthreading and loosening attributable to variety of forces, including vibratory. Tool 115 may be rotated to an infinite number of operating positions within a 360 degree operating range and is only limited where male threaded portion 90 is maximally threaded whereby no further threadable rotation is possible.

Regarding the method of production, first housing member 10, second housing member 15, gear 25, pushbutton 35 and snap axle 45, may be easily and economically produced by injection molding. In preferred embodiments, the above components may be comprised of 30% glass filled nylon, polypropylene, rubber polymer and nanofibers, cast metals, any combination of these materials, or other suitable materials.

Although the present invention has been described with reference to the preferred embodiments, it should be understood that various modifications and variations can be easily made by those skilled in the art without departing from the spirit and scope of the invention. Accordingly, the foregoing disclosure should be interpreted as illustrative only and is not to be interpreted in a limiting sense. It is further intended that any other embodiments of the present invention that result from any changes in application or method of use or operation, method of manufacture, shape, size, or material which are not specified within the detailed written description or illustrations contained herein yet are considered apparent or obvious to one skilled in the art are within the scope of the present invention.

What is claimed is:

1. A tool positioning apparatus comprising:
    a first housing member having an aperture, wherein said first housing member has an internal surface and external surface, said internal surface having a plurality of housing teeth, said external surface bearing a male threading for attaching a tool;
    a second housing member, said second member in contact with and rotatable relative to said first housing member, said second member having a coupling means for attaching to a pole;
    a gear disposed between said first housing member and second housing member, said gear having an outwardly facing gear surface and an inwardly facing gear surface, wherein gear teeth disposed on said inwardly facing gear surface reversibly engage said housing teeth, said gear having two opposing substantially straight sides and two opposing substantially curved sides, wherein an outwardly oriented triangular protrusion is disposed at the relative center of each said substantially straight sides;
    a biasing means to urge said gear into a meshing engagement with said housing teeth;
    a push button disposed within said aperture of said first housing member, said push button having at least one projection for making reversible contact with the inwardly facing surface of said gear when said pushbutton is actuated, wherein the housing teeth and gear teeth are disengaged from the meshing engagement when the force from said push button is sufficient to overcome said biasing means, whereby said first and second housing members may be rotated relative to each other;
    a tool handle housing coupled to a tool;
    a female housing coupled to said tool handle housing, the inner surface of said female housing having a female threading, said threading capable of reversibly threadably engaging said male threading.

2. The tool positioning apparatus according to claim 1, wherein said biasing means is a spring means.

3. The tool positioning apparatus according to claim 2, further comprising a plurality of cylindrical housings disposed within said second housing member, wherein said spring means comprises a plurality of springs each having a first end and second end, said first end contacting said outwardly facing surface of said gear, the second end of each said spring recessed within one of said cylindrical housings.

4. The tool positioning apparatus according to claim 1, wherein said push button has four projections.

5. The tool positioning apparatus according to claim 1, wherein said first housing member has a circumferential rim and second housing member has a circumferential recess permitting the first and second housing members to rotatably engage along the perimeter of each.

6. The tool positioning apparatus according to claim 1, wherein said coupling means for attaching a pole comprises a second housing member bearing a hexagonally shaped projection having a series of progressive rib protrusions.

7. The tool positioning apparatus according to claim 1, wherein said second housing member has a central aperture.

8. The tool positioning apparatus according to claim 7, further comprising a snap axle resting within said central aperture of second housing member, said snap axle having a plurality of resilient inwardly deformable legs, each bearing an external ridge.

9. The tool positioning apparatus according to claim 1, wherein said female threading is a tapered elastomeric threading.

10. A tool positioning apparatus comprising:
a first housing member having an aperture, wherein said first housing member has internal surface and external surface, said internal surface having a plurality of housing teeth, said external surface bearing a female threading for attaching a tool;
a second housing member, said second member in contact with and rotatable relative to said first housing member, said second member having a coupling means for attaching to a pole;
a gear disposed between said first housing member and second housing member, said gear having an outwardly facing gear surface and an inwardly facing gear surface, wherein gear teeth disposed on said inwardly facing gear surface reversibly engage said housing teeth, said gear having two opposing substantially straight sides and two opposing substantially curved sides, wherein an outwardly oriented triangular protrusion is disposed at the center of each said substantially straight sides;
a biasing means to urge said gear into a meshing engagement with said housing teeth;
a push button disposed within said aperture of said first housing member, said push button having at least one projection for making reversible contact with the inwardly facing surface of said gear when said pushbutton is actuated, wherein the housing teeth and gear teeth are disengaged from the meshing engagement when the force from said push button is sufficient to overcome said biasing means, whereby said first and second housing members may be rotated relative to each other;
a tool handle housing coupled to a tool, wherein said tool handle housing bears a male threading;
wherein said female threading on said first housing member is capable of reversibly threadably engaging said male threading on said tool handle housing.

11. The tool positioning apparatus according to claim 10, wherein said biasing means is a spring means.

12. The tool positioning apparatus according to claim 11, further comprising a plurality of cylindrical housings disposed within said second housing member, wherein said spring means comprises a plurality of springs each having a first end and second end, said first end contacting said outwardly facing surface of said gear, the second end of each said spring recessed within one of said cylindrical housings.

13. The tool positioning apparatus according to claim 10, wherein said push button has four projections.

14. The tool positioning apparatus according to claim 10, wherein said first housing member has a circumferential rim and second housing member has a circumferential recess permitting the first and second housing members to rotatably engage along the perimeter of each.

15. The tool positioning apparatus according to claim 10, wherein said coupling means for attaching a pole comprises a second housing member bearing a hexagonally shaped projection having a series of progressive rib protrusions.

16. The tool positioning apparatus according to claim 10, wherein said second housing member has a central aperture.

17. The tool positioning apparatus according to claim 16, further comprising a snap axle resting within said central aperture of second housing member, said snap axle having a plurality of resilient inwardly deformable legs, each bearing an external ridge.

18. The tool positioning apparatus according to claim 10, wherein said female threading is a tapered elastomeric threading.

19. A tool positioning apparatus comprising:
a first housing member having a plurality of housing teeth, wherein said housing has a circumferential rim about the perimeter of said housing, said housing member having a threaded male projection;
a gear having an outwardly facing gear surface and an inwardly facing gear surface, wherein said gear has gear teeth disposed on said inwardly facing gear surface which reversibly engage said housing teeth, wherein said gear has two opposing substantially straight sides and two opposing substantially curved sides, wherein an outwardly oriented triangular protrusion is disposed at the center of each said substantially straight side;
a second housing member having a centrally disposed aperture, a circumferential recess about the perimeter of said housing permitting said first housing member and said second housing member to rotatably engage along the perimeter of each, wherein said housing member has a plurality of cylindrical housings mounted on the innermost aspect of said second housing member;
a plurality of springs having a first end and second end, said first end contacting said outwardly facing gear surface, the second end of each said spring each recessed within one of said cylindrical housings;
a push button, said push button having projections and having a hollow cylinder bearing a plurality of ribs oriented lengthwise across said cylinder;
a snap axle, said snap axle having a center aperture and plurality of inwardly deformable legs;
a screw inserted through the center aperture of snap axle, wherein the terminal end of said screw inserts into hollow cylinder of said pushbutton and engages at least one of the plurality of said ribs;
a tool handle having a female housing, the innermost aspect of said housing having an internal elastomeric tapered threading, said threading tapering from wide to narrow; wherein said threaded male projection screwably engages said internal threading within said female housing;
wherein said terminal end of said screw may self-tap the ribs within said cylinder and screwably fasten snap axle and pushbutton, wherein said first housing member, second housing members, springs, and gear are fastened therebetween.

* * * * *